No. 11,786. Reissued Nov. 7, 1899.
F. C. NEWELL.
ELECTROMAGNETIC BRAKE.
(Application filed June 15, 1899.)
2 Sheets—Sheet 1.
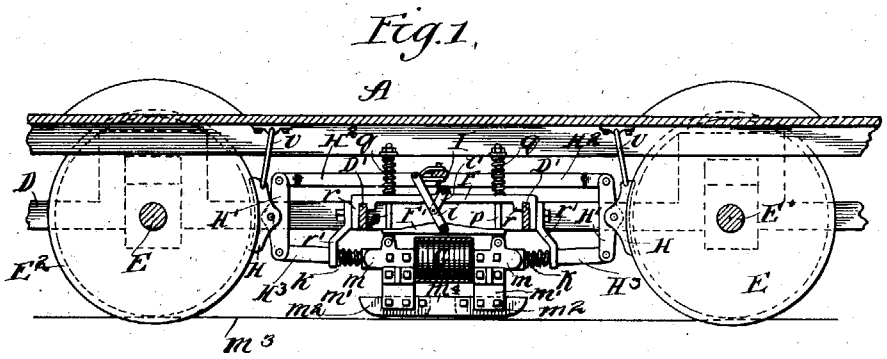
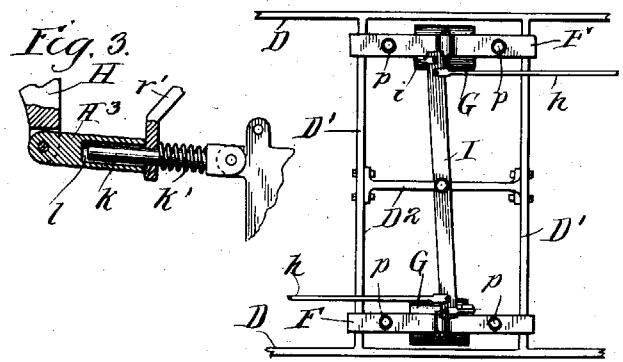
Witnesses
Edward Barrett
J. B. Weir
Inventor
Frank C. Newell
by Paul Synnestvedt Atty.

No. 11,786. Reissued Nov. 7, 1899.

F. C. NEWELL.

ELECTROMAGNETIC BRAKE.

(Application filed June 15, 1899.)

2 Sheets—Sheet 2.

Witnesses;
Edward Barrett.
J. B. Weir

Inventor
Frank C. Newell
by Paul Synnestvedt & Atty

UNITED STATES PATENT OFFICE.

FRANK C. NEWELL, OF CHICAGO, ILLINOIS, ASSIGNOR TO THE WESTINGHOUSE AIR BRAKE COMPANY, OF WILMERDING, PENNSYLVANIA.

ELECTROMAGNETIC BRAKE.

SPECIFICATION forming part of Reissued Letters Patent No. 11,786, dated November 7, 1899.

Original No. 616,956, dated January 3, 1899. Application for reissue filed June 15, 1899. Serial No. 720,719.

*To all whom it may concern:*

Be it known that I, FRANK C. NEWELL, a citizen of the United States, residing at Chicago, in the county of Cook and State of Illinois, have invented a new and useful Improvement in Electromagnetic Brakes, of which the following is a specification.

My invention relates to an improvement in brakes for cars, and primarily for cars which are propelled by electricity and are to that end equipped with electric motors.

My improvement involves the use of the track-brake variety of brake or that which is normally held in suspension out of contact with the track-rail to be forcibly brought into contact therewith for checking the motion of the car and for actuating the wheel-brakes, and I produce this forcible contact when the brake action is required and also wheel-brake contact by electric power applied through the medium of a suitably-arranged electromagnet.

The immediate connection for use with which I have more particularly devised my improvement is that of an electric trolley-car, and though I do not limit my invention thereto, since the principle is applicable to an electric car driven by electricity generated or stored upon it, because of having so particularly devised it, the description hereinafter contained is in the main confined to the invention as adapted to that connection, and it is so illustrated in the accompanying drawings, in which—

Figure 4:
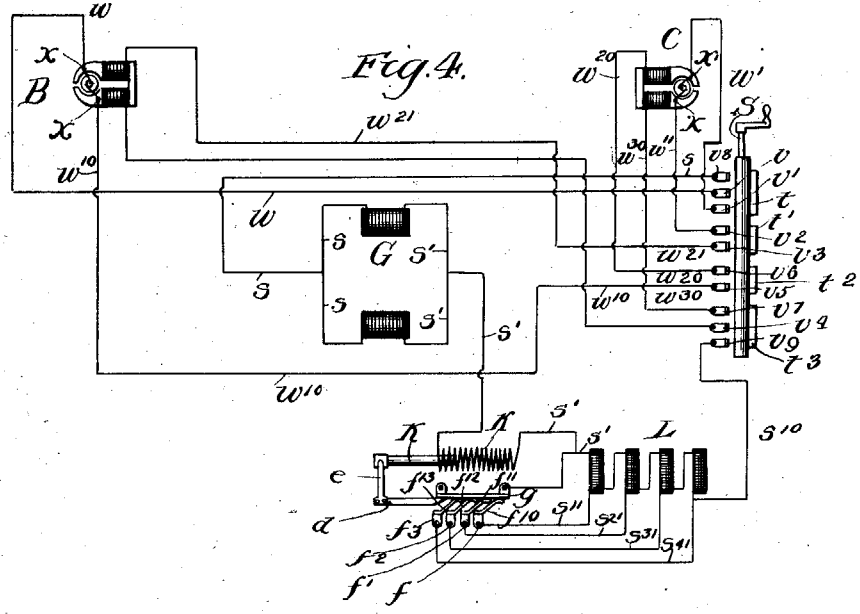
Figure 5:
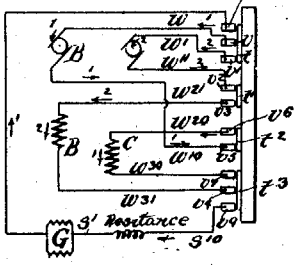

Figure 1 is a longitudinal sectional view of the bottom portion of a car equipped with my improvement; Fig. 2, a broken plan view showing the frame on which the electromagnetic track-brakes are suspended from the truck-frame and the sway-bar-carrying toggle-lever mechanism for actuating the ordinary brake-shoes against the wheels and operative by hand from brake levers or spindles on platforms with which the sway-bar is connected; Fig. 3, an enlarged broken sectional view of a spring-controlled thrust-rod detail of the electromagnetic brake mechanism; Fig. 4, a diagram of the electromagnetic brake mechanism and the circuits on which it is operated; and Fig. 5 a diagrammatic representation of the arrangement of the armatures, fields, brake-magnets, and resistance when the brake-circuit is closed.

As applied to an electric trolley-car the gist of my improvement includes the utilization of the inertia of the moving car after disconnecting the motor or motors from the line-wire preparatory to bringing the car to a standstill to convert each motor into a current-generating dynamo, and thus cause it to supply the current for energizing the brake-magnet to set both the track and wheel brakes. This may be accomplished by the mechanism illustrated in the drawings, which embodies my invention in the best form at present known to me and of which the following is a detailed description.

A denotes an electric trolley-car of any desired general construction provided, as is now customary for driving it, with two electric motors B and C, Fig. 4, suitably placed on the car and each being connected with one of the axles, respectively, near the opposite ends of the car in any well-known or suitable manner.

To avoid confusion and because of the lack of novelty therein, I omit any description and any showing in the drawings of the connections with the running-gear of the car of the motors and of the electric connection with them of a trolley, and it is to be understood that the circuits leading from the dynamos, into which the motors are converted, and containing the electromagnetic brake mechanism, all as hereinafter described, and shown in Fig. 4, are quite separate from and independent of the circuits through which the motors are supplied with current for driving them.

D denotes the main frame of the car-truck, in which are supported the axles E E′, carrying the wheels $E^2$ $E^3$, all in a usual or any proper way, and between the wheels there extend transversely of the side bars of the truck-frame D the bars D′ D′, braced midway between their ends by the cross-bar $D^2$ and forming a supplemental frame. On the bars D′, near the opposite ends of the supplemental frame formed with them, are seated, at their angular socket ends $r$ $r$, the hanger-bars F F in openings, near the extremities of which are supported, on adjustable springs $q$, the rods $p$.

G G are electromagnets, each comprising a spool suitably wound with insulated wire and having its pole ends extended horizontally outward, as shown at $m\,m$ in Fig. 1, with rectangular downward extensions $m'\,m'$, terminating at their lower ends in shoes $m^2\,m^2$, which are preferably connected by an interposed section $m^4$, of insulating material, such as wood, to afford a shield for protecting the wiring of the magnet against injury from objects encountered on the track and which might otherwise be forcibly projected against the magnets by the motion of the car. Each magnet G is supported on the frame D′ by having its pole-sections $m$ pivotally connected, as shown in Fig. 1, with the lower ends of a pair of the spring-controlled rods $p$, through the medium of which the magnets are loosely hung on the bars F, with the shoe-terminals $m^2$ of their poles respectively coincident with the rails $m^3$, which form the armatures of the magnets. As will be seen, therefore, when the magnets are energized, as hereinafter described, they are attracted to the rails, and the two magnets, which are suspended from opposite sides of the longitudinal center of the car-truck between the wheels $E^2$ $E^3$, should be suitably connected, as indicated, to cause them to move uniformly together.

To each member of the pairs of wheels $E^2$ $E^3$ (only one member of each pair is shown in Fig. 1, owing to the nature of the view selected for illustration) is applied a brake-shoe H, suspended by a link $v$ from the bottom of the car and pivotally connected with the cross-head H′ between its ends. These cross-heads are pivotally connected together at their upper ends in pairs lengthwise of the car by bars $H^2$, and to their lower ends are pivoted shorter bars or arms $H^3$, having longitudinal sockets $l$, Fig. 3, extending inward from their free ends, at which they abut against rigid perforated arms $r'$, depending from the angular ends of the hanger-bars D′, the perforations in which coincide with the sockets $l$ to admit into the latter through the perforations thrust-rods $k$, pivotally connected with the outer ends of the magnet-core sections $m$ and surrounded by springs $k'$, confined between said ends and the arms $r'$.

The members of each pair of the rods $p$ are connected lengthwise of the car below the plane of the bars F by bars F′, of non-magnetic material, having pivotally connected with them, between their ends, levers $i$, respectively connected pivotally at their upper ends with the opposite end portions of a sway-bar I, fulcrumed midway between its extremities upon the brace-bar $D^2$. These levers $i$ are longer than the normal perpendicular distance between the sway-bar and either connecting-bar F′. Hence they normally extend beyond the bottom of the sway-bar, with which they are so connected as to extend, respectively, at opposite sides of its opposite end portions. Each lever $i$ is pivotally connected from a point between its ends by a link $i'$ with a hanger-bar F near its center. Thus when the magnets under the effect of energizing them, as hereinafter described, are attracted against the resistance of the springs $q$ to engage their armatures afforded by the rails $m^3$ the continued movement of the car—say in the direction toward the wheels—will, with the magnets clinging to the rails, force the thrust-rods $k$ adjacent to the wheels $E^2$ against the bases of the respective sockets $l$ in the arms $H^3$, thereby forcing the brake-shoes for the wheels $E^2$ against the latter by the force exerted against the lower ends of the heads H′. As the lower ends of these heads swing toward the wheels $E^2$ their upper ends swing in the opposite direction and by their connection through the bars $H^2$ with the pivotal heads H′ of the brake-shoes for the wheels $E^3$ set these shoes against the latter. The purchase for the pressure with which the brakes H are set is afforded by the stop effect of the rigid arms $r'$ adjacent to the wheels $E^3$ and against which the socketed arms $H^3$ bear.

Obviously when the car is traveling in the opposite direction under the same conditions of applying the brakes, as already described, with the car moving in the direction toward the wheels $E^2$, the thrust for setting the brakes H is by the arms $H^3$ adjacent to the wheels $E^3$, when the purchase for the setting-pressure is afforded by the arms $H^3$ against the stops $r'$ adjacent to the wheels $E^2$.

When it is desired to apply the brakes H by hand from a platform, the brake-spindle (not shown) thereon is operated, and by its connection through the medium of a rod $h$ or the like with the sway-bar I turns the latter, thereby, owing to the species of the toggle-lever connection with it of the bars F and F′, depressing the magnets G and at the same time forcing them in the direction toward the wheels $E^2$ to set the brake-shoes H against the wheels in the manner hereinbefore described.

Following is a description of the magnet-circuits and of the external resistance-circuits illustrated in Fig. 4.

From the positive brush $x$ of the motor B there leads the conductor $w$ to a terminal $v$, and a wire $w'$ leads from the corresponding brush $x'$ of the motor C to a terminal $v'$. A conductor $w^{11}$ leads from the negative brush $x^{11}$ of the motor C to a terminal $v^2$, and from an adjacent terminal $v^3$ there leads a conducting-wire $w^{21}$ to the positive side of the field of the motor B, from the negative side of which there leads a conductor $w^{31}$ to a terminal $v^4$. A conductor $w^{10}$ leads from the negative brush $x^{10}$ of the motor B to a terminal $v^5$, adjacent to which is another terminal $v^6$, having leading from it a conductor $w^{20}$ to the positive side of the field of the motor C, and from the negative side of that field there leads a conductor $w^{30}$ to a terminal $v^7$. This leaves the two extreme terminals $v^8$ and $v^9$ to be connected in an external circuit, as hereinafter described. These terminals are supported in vertical alinement adjacent to a vertical series of circuit-closing contacts supported to be brought into engagement when desired with the terminals by a rotary spindle S, which may be understood to be provided in a suitably-accessible position on a car-platform or by some other suitable device. The contact $t$ coöperates with the terminals $v$, $v'$, and $v^8$, the contact $t'$ with the terminals $v^2$ $v^3$, the contact $t^2$ with the terminals $v^5$ $v^6$, and the contact $t^3$ with the terminals $v^4$, $v^7$, and $v^9$.

Where two motors employed to work together for the purpose of driving the car are converted into generators working in multiple by the inertia of the car in motion when the line-current is cut off, there is always liability of one to generate voltage greater than the other and interfere with the latter by sending current through it in the reverse direction. This, as will be seen, is obviated by the described circuit-wiring when the circuits are closed by bringing the contacts into engagement with the terminals, since it produces excitement of the field of each from the armature of the other, for the field of one is connected in series with the armature of the other.

From the terminal $v^8$ there leads a conductor $s$ through the magnets G G, emerging therefrom as the conductor $s'$, containing a solenoid-coil K and branching at $y$ at one side to a contact-bar $g$ and at the opposite side to the first of a series of resistances L, in any desired number, connected in series, as shown, and the final one of which is connected by a conductor $s^{10}$ with the terminal $v^9$. The four resistance-coils L shown are connected, respectively, by conductors $s^{11}$, $s^{21}$, $s^{31}$, and $s^{41}$ with terminals $f$, $f'$, $f^2$, and $f^3$, carrying the spring-contacts $f^{10}$, $f^{11}$, $f^{12}$, and $f^{13}$ to bear against the under side of the contact-bar $g$.

K' is the solenoid-core, suitably supported with relation to the coil K and carrying on a rigid pendent arm $e$ to move with the core a cut-out or contact-breaking finger $d$, of porcelain or other suitable non-conducting material.

The operation is as follows: When it is desired to stop the car and preparatory thereto, the motors B and C are disconnected from the line-wire and the contacts controlled by the spindle S are caused to engage the adjacent series of terminals, thereby throwing the positive terminals of both motors into multiple connection with the conductor $s$ $s'$ of the external circuit—that is to say, the terminals $v^8$, $v$, and $v'$ are connected, the conductors $w^{11}$ and $w^{21}$ are connected to connect the negative terminal of the armature of the motor C with the field of the motor B, the negative terminal of the armature of the motor B is connected with the field of the motor C by the conductors $w^{10}$ and $w^{20}$, and the outlet sides of the fields of the two motors are cross-connected by the conductors $w^{31}$ and $w^{30}$ with the return-conductor of the external circuit by the conductors $s^{10}$, $w^{31}$, and $w^{30}$. Thus the circuit is closed from both motors through the external circuit, including the magnet-brakes G.

By the inertia of the moving car the rotation of the axles converts the motors into generators (dynamos) to energize the magnets G, thereby engaging them with the rails to stop the car and causing their braking action to be supplemented in the manner described by applying the brake-shoes H to the car-wheels. The brake-shoes, however, may only be applied on trailers and are not necessarily provided on the motor-car.

An additional important purpose of my improvement is to provide for producing the brake action as the immediate result of the circuit-closer produced by operating the spindle S, and this by a uniform quantity of current from the dynamos irrespective of the speed at which the car is moving at the time the disconnection is made with the line-wire. Accordingly the arrangement of the mechanism is such as to produce the proper working of the magnet-brakes at the minimum speed of the car, depending upon the cutting in automatically of resistance according to the rate of greater speed at which the car may be moving to maintain the desired uniformity in the volume of current for operating the brakes, so that when the car is disconnected preparatory to stopping it, while running at the maximum speed with all the resistances in or while running at the minimum speed with all the resistances out or with any gradation of speed between these extremes, only enough current will be given from the dynamos to work the magnet-brakes. In this way unduly sudden stoppage is avoided, and there is no danger of burning out. The resistance mechanism accomplishes these objects as follows: The normal condition, with the magnet-circuits open, of the solenoid is that shown. The moment the car is disconnected from the line-current and its continued motion converts the motors into generators the current which energizes the magnets G, if it be not too strong, or, in other words, if the motion of the car be slow, will traverse the solenoid-coil and pass by way of the conductor $s'$, leading therefrom, to the contact-plate $g$, thence to the contact $f^{13}$ and terminal $f^3$ and over the conductor $s^{41}$ to the conductor $s^{10}$ and terminal $v^9$, which is connected by the circuit-closer $t^3$ with the fields of the dynamos through the terminal $v^4$ and conductor $w^{31}$ and the terminal $v^7$ and conductor $w^{30}$. Under these conditions all the resistances are cut out. Greater strength of current will energize the solenoid-coil K to suck in the core K' accordingly. Thus if the core be moved only far enough to interpose the cut-out $d$ between the contact $f^{13}$ and plate $g$ the last of the resistance-coils L will be cut in, causing the current to pass through it to the conductor $s^{10}$ from the plate $g$ to the contact $f^{12}$ and thence over the conductor $s^{31}$.

Still further movement of the core will actuate the finger $d$ to cut out in addition the contact $f^{12}$, thereby short-circuiting the current through the contact $f^{11}$ to the conductor $s^{21}$ and through the last two of the series of resistance-coils, and so on, the further movement of the core in accordance with the strength of current further cutting out the contact $f^{11}$ to send the current through the last three resistance-coils over the conductor $s^{11}$ or also cutting out the contact $f^{10}$ to cut in all the resistance-coils and send the current through them immediately from the coil K to the conductor $s'$.

More or fewer resistance-coils than the four illustrated may be provided, as desired, and to provide for the sudden stoppage of the car under the full force of the current generated, whatever the speed of the car may be, and thus to provide an emergency stop, the core K′ may be held against movement under the suction force of the coil K.

By the actuation of a wheel-shoe by means of a track or rail shoe magnetically applied several marked advantages are secured, for not only does the magnetic track-shoe better accommodate itself to curves and other irregularities in the track than other forms of track-shoe, but it also exerts an effective braking force without lifting up or reacting against the body of the car, and thereby does not take away from the amount of braking force which may be safely exerted against the wheel-shoes without danger of sliding the wheels. In fact, not only is there in the use of my invention no lessened weight or braking resistance in the case of the wheel-shoes, as is the case where mechanically-operated track-shoes are employed, but the weight upon the wheels and the efficiency of the wheel-shoes are increased by the downward pull exerted upon the suspension-springs whenever the rail-brake is attracted to the rail. It is further to be noted that by the use of my invention the dual effect and advantages of both a magnetically-operated track-shoe and an efficient wheel-brake are secured, all controlled by a single handle or lever.

I am aware that heretofore the employment of devices known as "chock-blocks" and comprising a track-shoe having a curved part rigidly connected or integral therewith to fit the periphery of the wheel has been suggested, by the action of which the wheels might be locked and their adhesion to the rails prevented and the weight of the car, trucks, and wheels transferred to a sliding shoe on the track; but in such apparatus, which I do not regard as coming within my invention, the wheel-shoe as a braking device for retarding the rotation of the wheel is eliminated, and the curved part embracing the wheel is only a locking device to prevent rotation of the wheels, the whole forming a skidding device which would operate very inefficiently as a brake. In my improvement the reverse of this obtains, as the combination of the wheel-shoe with the magnetic track-shoe not only permits the wheel-shoe to act with its usual efficiency, but this efficiency is greatly increased.

While, as hereinbefore stated, the drawings illustrate my invention in the form which I consider the best for its embodiment for the particular purpose for which it has been devised and which has been demonstrated by actual practical service to be operative, the structure may, to adapt the invention to different conditions, be variously modified by those skilled in the art without departure from my invention. Hence I do not wish to be understood as limiting my invention to the particular construction herein shown and described nor to the details thereof and combinations of parts, except where the intention so to do is made manifest by the terms of the more specific among the appended claims.

By the term "resistance" as used in the following claims I include the class of mechanical devices ordinarily designated by that term in the electrical art, one such being illustrated in the drawings; but I do not include under this term such additional working appliances, like storage batteries, which, while incidentally furnishing some resistance, are employed for other purposes of work or motion and are not known or used in the electrical art as suitable means for maintaining constancy of current. Such devices functionally and in actual use are not elements of current control, but where current control is desired themselves have to be controlled either by added resistance or other suitable agency.

Where the term "constant current" is employed I wish it to be understood as meaning a current which is practically constant or uniform so long as the speed of the armature is such as to generate a current sufficient for braking purposes, and where it is stated that "the resistance is proportioned to the speed of the car" I wish it to be understood as meaning that the resistance is so proportioned when such a considerable current is being generated.

What I claim as new, and desire to secure by Letters Patent, is—

1. In combination with an electric car, an electromagnet track-brake device in a circuit independent of the car-motor circuit and supported with its poles extending to coincide with a track-rail forming the magnet-armature and to yield longitudinally relative to the car, means for connecting, at will, in said independent circuit, the motor, thereby to convert it into a generator operated by the inertia of the car in motion to generate the current for actuating said device, brake-shoes connected with said device to be applied, when it is in engagement with its armature, by the inertia of the moving car, an external circuit including said device, and resistance mechanism in said external circuit provided with means for regulating it according to the speed of the car, substantially as described.

2. In an electromagnetic brake system for cars, an electromagnet track-brake device in a circuit independent of the car-motor circuit, means for connecting, at will, in said independent circuit the motor, thereby to convert it into a generator operated by the inertia of the car in motion to generate the current for actuating said device, and resistance mechanism in said external circuit comprising one or more resistance-coils, a contact-plate and one or more contacts each connected with a resistance-coil by a separate conductor, and a solenoid carrying on its core a cut-out finger to move between said contacts and contact-plate, substantially as and for the purpose set forth.

3. In combination with an electric car, an electromagnet track-brake device comprising a supplemental frame extending transversely of the car on the truck-frame and supporting hanger-bars carrying spring-controlled rods, electromagnets yieldingly suspended on said rods and included in an electric circuit independent of the car-motor circuit and having their poles extended to coincide with the track-rails forming the magnet-armatures, means for connecting, at will, in said independent circuit the motor thereby to convert it into a generator operated by the inertia of the car in motion to generate the current for exciting said magnets to engage with the rails, and brake-shoes pivotally carried on heads connected together from their upper ends, in pairs, by bars and each having a spring-controlled thrust-rod connection, from its lower end, with a magnet, substantially as described.

4. In combination with an electric car, an electromagnet track-brake device comprising a supplemental frame extending transversely of the car on the truck-frame and supporting hanger-bars carrying spring-controlled rods, rigid perforated arms $r'$ on said supplemental frame, electromagnets pivotally suspended on said rods and included in an electric circuit independent of the car-motor circuit and having their poles extended to coincide with the track-rails forming the magnet-armatures, means for connecting, at will, in said independent circuit the motor thereby to convert it into a generator operated by the inertia of the car in motion to generate the current for exciting said magnets to engage with the rails, brake-shoes on heads H′ connected in pairs from their upper ends by bars $H^2$ and having socket-arms $H^3$ extending from their lower ends against said arms $r'$, and spring-controlled thrust-rods $k$ extending from opposite ends of the magnets through said perforated arms into said socket-arms, substantially as described.

5. In combination with an electric car, an electromagnet track-brake device comprising a supplemental frame on the truck-frame and supporting hanger-bars carrying spring-controlled rods, electromagnets yieldingly suspended on said rods and included in an electric circuit independent of the car-motor circuit and having their poles extended to coincide with the track-rails forming the magnet-armatures, means for connecting, at will, in said independent circuit the motor thereby to convert it into a generator operated by the inertia of the car in motion to generate the current for exciting said magnets to engage with the rails, brake-shoes pivotally carried on heads connected together from their upper ends by bars and each having a spring-controlled thrust-rod connection, from its lower end, with a magnet, and means for operating said brake-shoes by hand, comprising a sway-bar on said supplemental frame having near each end a toggle-lever connection with a magnet and a connection with the brake-spindle on the car-platform, substantially as described.

6. In an electric car, the combination with the two electric motors for driving it of an electric circuit, independent of the motor-circuit, connecting the field of each motor in series with the armature of the other, said independent circuit being normally open and having terminals, circuit-closers operative at will to engage said terminals to close said independent circuit and thereby convert said motors into generators operated by the inertia of the car in motion, and an electromagnet track-brake device in said independent circuit supported with its poles extending to engage a track-rail forming its armature, substantially as and for the purpose set forth.

7. In an electric car, the combination with the two electric motors for driving it of an electric circuit, independent of the motor-circuit, connecting the field of each motor in series with the armature of the other, said independent circuit being normally open and having terminals in serial alinement, an electromagnet track-brake device in said independent circuit supported with its poles extending to engage a track-rail forming its armature, an external circuit connected with said independent circuit and having a terminal in alinement with its terminals, one or more resistance-coils and a solenoid cut-out device therefor in said external circuit, and circuit-closers for said terminals and operative to close said circuits and thereby convert said motors into generators operated by the inertia of the car in motion, substantially as and for the purpose set forth.

8. In a car-brake apparatus, a wheel-shoe and a magnetic track-brake device, means whereby to set the wheel-shoe by longitudinal movement of the track-brake device relative to the car, and means whereby to increase the pressure of the wheels upon the track simultaneously therewith.

9. A car-brake mechanism comprising a wheel-brake and an electromagnetic track-brake applied by magnetic attraction between the track and the rail, and means whereby said wheel-brake is applied through a longitudinal movement of said track-brake relative to and by the inertia of the car.

10. In a car-brake apparatus, a track-shoe adapted to be held on the track-rail by magnetic attraction between the rail and track-shoe, and a wheel-shoe adapted to be applied to a wheel by longitudinal movement of the track-shoe relative to the car.

11. A wheel-shoe and a magnetically-actuated rail-shoe arranged longitudinally of the rail and loosely hung by a spring hanging mechanism whereby such rail-shoe is free to move, substantially as described, to and from the rail and also rearwardly to actuate the wheel-shoe.

12. A brake apparatus having a magnetic track-shoe, a wheel-shoe at each end of said track-shoe, a connection leading from said track-shoe to each of said wheel-shoes, and means whereby on movement of the car in either direction the track-shoe when magnetically applied will by longitudinal movement relative to the car and through the inertia thereof serve to set the wheel-shoe connected therewith.

13. A brake having a magnetic track-shoe, a wheel-shoe at each end of said track-shoe, a thrust-rod leading from said track-shoe to each of said wheel-shoes, and means whereby on movement of the car in either direction the track-shoe when magnetically applied may by longitudinal movement relative to the car and through the inertia thereof serve to set the wheel-shoe in the rear thereof.

14. In a brake apparatus, the combination with a magnetic track-shoe of a plurality of wheel-shoes adapted to be applied by longitudinal movement of the track-shoe.

15. In a brake apparatus, the combination with a track-shoe of two wheel-shoes and means whereby the shoes may be moved simultaneously in opposite directions by longitudinal movement of the track-shoe.

16. In a car-brake apparatus, the combination with a track-shoe and two wheel-shoes of means whereby, on movement of the car in either direction, the track-shoe, by longitudinal movement, may set both wheel-shoes.

17. A brake having two wheel-shoes, in combination with a single magnetic track-shoe, and means whereby, on movement of the car in one direction, the track-shoe by longitudinal movement will set one of said wheel-shoes, and on movement of the car in the opposite direction the track-shoe, by longitudinal movement, will set the other of said wheel-shoes.

18. A brake having a track-shoe, a wheel-shoe at each end of said track-shoe, a slidingly-extensible or telescopic connection leading from said track-shoe to each of said wheel-shoes and means whereby, on movement of the car in either direction, the track-shoe when applied may serve to set one of the wheel-shoes without affecting the release position of the other.

19. A car-brake comprising a rail-brake, a wheel-shoe at each end of said rail-brake, a lever on one of said wheel-shoes, connections from said lever to the rail-brake, and a rod or connection constructed to transmit the force of said lever to the other wheel-shoe.

20. A brake having a track-shoe, a wheel-shoe forward and a wheel-shoe back of said track-shoe, a cross-head H′ upon each wheel-shoe, a connecting-rod between said cross-heads for transmitting the braking force from one of said wheel-shoes to the other, a connection between said track-shoe and one of said cross-heads whereby the application of the track-shoe actuates the cross-heads to set the wheel-shoes, and a rigid arm upon the truck forming a stop against which the braking force may act.

21. In a car-brake apparatus, the combination with an electric motor adapted to be employed as a generator when disconnected from the line, of a magnetic track-brake device connected so as to be energized by the current from the motor when the motor acts as a generator, and a wheel-shoe adapted to be set by longitudinal movement of the track-brake device relative to the car.

22. An electric brake having generators driven by the movement of the car, a brake-magnet and automatically-operated resistance mechanism comprising a plurality of coils each provided with a separate circuit and contact and a magnetically-operated switch device coöperating with said contacts, whereby the resistance in the brake-magnet circuit is proportioned to the speed of the car.

23. In a car-brake apparatus the combination with a magnetic track-brake and a wheel-brake of, means whereby the track-brake may operate by a longitudinal movement to apply the wheel-brake through the inertia of the car and when the car is moving in either direction.

24. A brake apparatus having a magnetic track-shoe, a wheel-shoe in front and a wheel-shoe in the rear thereof, and suitable connecting mechanism from the track-shoe to each wheel-shoe, substantially as described, whereby on movement of the car in one direction the track-shoe will, through such mechanism, actuate one of the wheel-shoes, and when moving in the other direction, will actuate the other wheel-shoe, such actuation being effected by longitudinal movement of the track-shoe relative to the car.

25. A brake apparatus having a magnetic track-shoe, a wheel-shoe in front and a wheel-shoe in the rear thereof, and a thrust-rod connection from the track-shoe to each wheel-shoe, substantially as described, whereby on movement of the car in either direction, the track-shoe will, through such mechanism, actuate the wheel-shoe in the rear thereof, such actuation being effected by longitudinal movement of the track-shoe relative to the car.

26. A brake apparatus having a track-shoe, a wheel-shoe in front and a wheel-shoe in the rear thereof, and sliding extensible connecting mechanism for the track-shoe to each wheel-shoe, substantially as described, whereby on movement of the car in one direction the track-shoe will, through such mechanism, actuate one of the wheel-shoes, and when moving in the other direction, will actuate the other wheel-shoe, such actuation of each wheel-shoe being effected without affecting the release position of the other.

27. A car-brake comprising a rail-brake, a wheel-shoe in front, and a wheel-shoe in the rear thereof, suitable interposed mechanism between the rail-brake and one of said shoes whereby to actuate the latter from the former and other suitable mechanism between the wheel-shoes whereby the operation of one wheel-shoe shall actuate the other.

28. In a car-brake apparatus, the combination with a track-shoe and two wheel-shoes, one in front and one in the rear thereof, of suitable mechanical connections from the track-shoe to each wheel-shoe, and other suitable connections between the wheel-shoes whereby on movement of the car in either direction the track-shoe when applied may simultaneously set both wheel-shoes.

29. In an electric brake apparatus, a brake-magnet and a resistance included in the same circuit and means for automatically increasing the resistance with an increase of current, and decreasing the resistance with a decrease of current so as to control the current by which the brake-magnet is energized whereby to maintain a current practically constant and not excessive through the brake-magnet.

30. In an electric brake apparatus, a brake-magnet and a resistance included in the same circuit and means for automatically effecting a graduated increase and decrease of the resistance so as to control the current by which the brake-magnet is energized.

31. In an electric brake apparatus, a brake-magnet and a resistance included in the same circuit, a solenoid and plunger and means connected with the plunger for automatically effecting a graduated increase and decrease of the resistance so as to control the current by which the brake-magnet is energized.

32. In an electric brake apparatus, the combination, with a wheel-brake, of a brake-magnet and a resistance device included in the same circuit, and means for automatically increasing and decreasing the resistance so as to prevent retardation of the car-axle by excessive current above that required in the brake-magnet, whereby locking of the wheels may be prevented.

33. In an electric brake apparatus, the combination, of a track-brake, a wheel-brake, a brake-magnet arranged to operate both brakes simultaneously with a normal uniform current, and an automatically-operating resistance mechanism for maintaining the current uniform with reference to both track-brake and wheel-brake efficiency, substantially as set forth.

FRANK C. NEWELL.

Witnesses:
PAUL CARPENTER,
PAUL SYNNESTVEDT.